(12) United States Patent
Patel et al.

(10) Patent No.: US 12,137,263 B2
(45) Date of Patent: *Nov. 5, 2024

(54) SYSTEMS AND METHODS FOR DETERMINING WHETHER TO UPDATE EMBEDDED ADVERTISEMENTS IN DOWNLOADED CONTENT USING ADVERTISEMENT UPDATE CRITERIA

(71) Applicant: Adeia Guides Inc., San Jose, CA (US)

(72) Inventors: Milan Indu Patel, Santa Clara, CA (US); Hyok Cho, Namyangju-si (KR); Young-Hwan Kim, Incheon (KR)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,192

(22) Filed: Jan. 18, 2023

(65) Prior Publication Data
US 2023/0247243 A1     Aug. 3, 2023

Related U.S. Application Data

(63) Continuation of application No. 17/245,236, filed on Apr. 30, 2021, now Pat. No. 11,589,099, which is a
(Continued)

(51) Int. Cl.
*H04N 21/458*     (2011.01)
*H04N 21/234*     (2011.01)
(Continued)

(52) U.S. Cl.
CPC . *H04N 21/26291* (2013.01); *H04N 21/23424* (2013.01); *H04N 21/23892* (2013.01);
(Continued)

(58) Field of Classification Search
CPC ....... H04N 21/26291; H04N 21/23424; H04N 21/23892; H04N 21/44204;
(Continued)

(56) References Cited

U.S. PATENT DOCUMENTS 6,239,794 B1    5/2001  Yuen et al.
6,564,378 B1    5/2003  Satterfield et al.
(Continued)

OTHER PUBLICATIONS

PCT , PCT International Search Report for International Application No. PCT/US2017/040529, dated Sep. 18, 2017 (13 pages).
(Continued)

*Primary Examiner* — John R Schnurr
(74) *Attorney, Agent, or Firm* — HALEY GUILIANO LLP

(57) ABSTRACT

Systems and methods for updating advertisements embedded in a media asset scheduled for download at a future time. The media guidance application may receive a request from a user to download a media asset at a future time, where the media asset includes a plurality of embedded advertisements. The media guidance application may determine whether to update an embedded advertisement in the plurality of embedded advertisements. After determining to update the embedded advertisement, the media guidance application may replace the embedded advertisement with an updated advertisement in the media asset.

20 Claims, 6 Drawing Sheets

Related U.S. Application Data continuation of application No. 16/627,746, filed as application No. PCT/US2017/040529 on Jun. 30, 2017, now Pat. No. 11,032,594.

(51) Int. Cl.
  *H04N 21/2389* (2011.01)
  *H04N 21/239* (2011.01)
  *H04N 21/262* (2011.01)
  *H04N 21/442* (2011.01)
  *H04N 21/45* (2011.01)
  *H04N 21/472* (2011.01)
  *H04N 21/81* (2011.01)
  *H04N 21/8355* (2011.01)

(52) U.S. Cl.
  CPC ... *H04N 21/2393* (2013.01); *H04N 21/44204* (2013.01); *H04N 21/4532* (2013.01); *H04N 21/47217* (2013.01); *H04N 21/812* (2013.01); *H04N 21/8355* (2013.01)

(58) Field of Classification Search
  CPC ............. H04N 21/4532; H04N 21/812; H04N 21/2393; H04N 21/47217; H04N 21/8355; G06Q 30/0241
  See application file for complete search history.

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 9,380,332 B1* | 6/2016 | Mills ..................... H04N 21/812 |
| 9,584,874 B1* | 2/2017 | Farías ............... H04N 21/44213 |
| 11,032,594 B2* | 6/2021 | Patel ................. H04N 21/47217 |
| 11,589,099 B2 | 2/2023 | Patel et al. |
| 2002/0174430 A1 | 11/2002 | Ellis et al. |
| 2003/0154128 A1 | 8/2003 | Liga et al. |
| 2003/0170000 A1* | 9/2003 | Iwashita .......... H04N 21/41415 386/250 |
| 2005/0251827 A1 | 11/2005 | Ellis et al. |
| 2006/0177200 A1 | 8/2006 | Deutmeyer et al. |
| 2008/0155581 A1 | 6/2008 | Jeary |
| 2008/0155588 A1* | 6/2008 | Roberts ............ H04N 21/25808 725/34 |
| 2008/0235090 A1* | 9/2008 | Lundstrom ...... H04N 21/44218 705/14.67 |
| 2009/0030978 A1* | 1/2009 | Johnson ............ H04N 21/8456 709/203 |
| 2010/0153885 A1 | 6/2010 | Yates |
| 2011/0197224 A1* | 8/2011 | Meijer ................. H04N 21/812 386/E5.003 |
| 2014/0101686 A1* | 4/2014 | Kitts .................. H04N 21/812 725/14 |
| 2014/0181860 A1 | 6/2014 | Aguilar Fargas et al. |
| 2014/0259057 A1 | 9/2014 | Lv et al. |
| 2015/0325268 A1* | 11/2015 | Berger ............... H04N 21/4335 386/248 |
| 2017/0150192 A1 | 5/2017 | Sellers et al. |
| 2017/0188115 A1* | 6/2017 | Bafekr ................. H04N 21/812 |
| 2017/0208369 A1* | 7/2017 | Major ................ H04N 21/8456 |
| 2021/0250634 A1 | 8/2021 | Patel et al. |
| 2023/0362426 A1 | 11/2023 | Patel et al. |

OTHER PUBLICATIONS

U.S. Appl. No. 18/222,652, filed Jul. 17, 2023, Milan I. Patel.

\* cited by examiner

SYSTEMS AND METHODS FOR DETERMINING WHETHER TO UPDATE EMBEDDED ADVERTISEMENTS IN DOWNLOADED CONTENT USING ADVERTISEMENT UPDATE CRITERIA

CROSS-REFERENCE TO RELATED APPLICATION

This application is a continuation of U.S. patent application Ser. No. 17/245,236, filed Apr. 30, 2021, which is a continuation of U.S. patent application Ser. No. 16/627,746, filed Dec. 30, 2019, now U.S. Pat. No. 11,032,594, which is a national stage application under 35 U.S.C. § 371 of International Application PCT/US2017/040529, filed Jun. 30, 2017, each of which are hereby incorporated by reference herein in their entireties.

BACKGROUND

Downloading media content for viewing at a future time has become popular as of late in all forms of media. For example, many subscription services allow the user to download episodes of a television series for advanced viewing. Conventional systems may embed advertisements when downloading the media content. However, the conventional systems do not account for updating the embedded advertisements to reflect the user's latest preferences.

SUMMARY

Systems and methods are described herein for updating advertisements embedded in a media asset scheduled for download at a future time. For example, if a user has requested to download an episode of a television series for future viewing, the episode may be downloaded with a set of advertisements embedded in it. At a future time after the episode was downloaded, the user's preferences for advertisements may change. The advertisements embedded in the episode may be updated to reflect the user's changed preferences if user-specific update criteria are met. Thus, the systems and methods provided herein help ensure that the media asset contains current advertisements that are relevant to the user.

To this end and others, in some aspects of the disclosure, a media guidance application may receive a request from a user to download a media asset at a first future time, where the media asset includes a plurality of embedded advertisements. For example, the media guidance application may receive a request from a user to download an episode of the Food Network series Chopped at a first future time (e.g., 24 hours in the future), where the episode of Chopped includes embedded advertisements.

Based on receiving the request, the media guidance application may download the media asset at the first future time. For example, the media guidance application may download an episode of Chopped at the first future time (e.g., the first future time may be 24 hours from the user request).

In some embodiments, when the media guidance application downloads the media asset at the first future time, the media guidance application may retrieve advertisements from the online database based on a user-specific update criteria. For example the media guidance application may retrieve advertisements from an online advertising database based on a user-specific update criteria (e.g., may retrieve advertisements based on user preferences, popularity, etc.).

The media guidance application may embed the advertisements into the media asset. For example, the media guidance application may embed advertisements into the media asset (e.g., an episode of Chopped) at different points in the media asset.

The media guidance application may download the media asset at the first future time. For example, the media guidance application may download an episode of Chopped at the first future time (e.g., the first future time may be 48 hours from the user request).

Based on downloading the media asset at the first future time, at a second future time, the media guidance application may determine, based on a user-specific update criteria, whether an embedded advertisement in the plurality of embedded advertisements needs to be updated. For example, the media guidance application may determine that an embedded advertisement (e.g., an advertisement for the Olympics) needs to be updated based on a user-specific update criteria (e.g., no sports advertisements).

In some embodiments, when based on downloading the media asset at the first future time, at a second future time, the media guidance application may determine, based on a user-specified update criteria, whether an embedded advertisement in the plurality of embedded advertisements needs to be updated, the media guidance application may retrieve, from a user profile, user viewing history data. For example, the media guidance application may retrieve the user's viewing history data (e.g., a list of media content the user has previously viewed) from the user profile.

The media guidance application may determine, from the user viewing history data, whether the user viewed the media asset. For example, the media guidance application may compare the media asset's title to the user viewing history data to determine if the user has viewed the media asset.

In response to determining that the user has viewed the media asset, the media guidance application may determine that the embedded advertisement in the media asset needs to be updated. For example, the media guidance application may determine, from the user viewing history data, whether the user has viewed the media asset (e.g., the episode of Chopped). The media guidance application may determine that the advertisements in the episode of Chopped have already been seen by the user, and thus need to be updated.

In some embodiments, when based on downloading the media asset at the first future time, at a second future time, the media guidance application may determine, based on a user-specified update criteria, whether an embedded advertisement in the plurality of embedded advertisements needs to be updated, the media guidance application may retrieve, from a user profile, a threshold period of time. For example, the media guidance application may retrieve a threshold period of time (e.g., maybe 7 days) from the user profile that corresponds to an amount of time before an advertisement is expired.

The media guidance application may retrieve, from metadata for the embedded advertisement, an age of the embedded advertisement. For example, the media guidance application may retrieve, from the embedded advertisement's metadata, the advertisement's age, which may correspond to the date the advertisement was first added to the online advertisement database.

The media guidance application may compare the age of the embedded advertisement with the threshold period of time. For example, the media guidance application may compare the age of the embedded advertisement (e.g., maybe 14 days) with the threshold period of time (e.g., maybe 30 days).

In response to determining that the age of the embedded advertisement exceeds the threshold period of time, the media guidance application may determine that the embedded advertisement in the media asset needs to be updated. For example, the media guidance application may determine that the age of the embedded advertisement (e.g. may be 60 days) exceeds the threshold period of time (e.g., may be 30 days), and thus may determine that the embedded advertisement in the media asset needs to be updated.

In some embodiments, when based on downloading the media asset at the first future time, at a second future time, the media guidance application may determine, based on a user-specified update criteria, whether an embedded advertisement in the plurality of embedded advertisements needs to be updated, the media guidance application may determine, for a user profile, preferences for the user. For example, the media guidance application may determine the user's preferences (e.g., the user's social media preferences, online shopping preferences, etc.) from the user profile.

The media guidance application may determine from the preferences for the user, a user-based advertising criteria. For example, the media guidance application may determine from the user's preferences (e.g., the user loves online shopping, etc.) that the user-based advertising criteria may contain a criterion that the advertisement must be shopping-related.

The media guidance application may compare the embedded advertisements with the user-based advertising criteria. For example, the media guidance application may compare the embedded advertisements with the user-based advertising criteria (e.g., that the advertisement must be shopping-related because the user loves shopping).

The media guidance application may determine, from the comparison, whether the embedded advertisement meets the user-based advertising criteria. For example, the media guidance application may determine, from the comparison, that the advertisement (e.g., maybe an advertisement for the Olympics) does not meet the user-based advertising criteria (e.g., that the advertisement must be shopping-related).

In response to determining that the embedded advertisement does not meet the user-based advertising criteria, the media guidance application may determine that the embedded advertisement in the media asset needs to be updated. For example, in response to the media guidance application determining that an Olympics-related advertisement does not meeting the user-based advertising criteria (e.g., that the advertisement must be shopping related), the media guidance application may determine that the embedded advertisement in the media asset needs to be updated.

The media guidance application may replace the embedded advertisement with the updated embedded advertisement in the media asset. For example, the media guidance application may replace the advertisements that the user has already viewed in an episode of chopped with updated advertisements (e.g., new advertisements that the user has not previously viewed).

Based on determining that the embedded advertisement needs to be updated, the media guidance application may retrieve an updated embedded advertisement from an online database using the user-specified update criteria. For example, the media guidance application may retrieve an updated embedded advertisement (e.g., an advertisement for a music streaming service, such as SPOTIFY) using the user-specified update criteria (e.g., the user enjoys advertisements about music).

In some embodiments, when the media guidance application is retrieving an updated embedded advertisement from an online database using the user-specified update criteria, the media guidance application may receive, from the user, a time at which the user plans to view the media asset. For example, the media guidance application may receive an input (e.g., the user entering a viewing time using keyboard commands) from the user corresponding to a time when the user plans to view the media asset (e.g., the user entering "July 14 at 8:00 pm").

The media guidance application may retrieve, from the online database, a candidate advertisement from a plurality of advertisements. For example, the media guidance application may retrieve from an online advertising database a candidate advertisement (e.g., may choose the newest advertisement on the database).

The media guidance application may compare the candidate advertisement with a time-of-day advertising criteria from the user-specific update criteria. For example, the media guidance application may compare the candidate advertisement (e.g., may be an advertisement for a breakfast product) with a time-of-day criteria (e.g., advertisements related to the morning are shown only if the user's planned viewing time takes place between 5:00 am-12:00 pm).

The media guidance application may determine, from the comparison, whether the candidate advertisement meets the time-of-day advertising criteria. For example, the media guidance application may determine, from the comparison, that the candidate advertisement (e.g., an advertisement for a breakfast product) meets the time-of-day criteria (e.g., advertisements related to the morning are shown only if the user's planned viewing time takes place between 5:00 am-12:00 pm).

In response to determining that the candidate advertisement meets the time-of-day advertising criteria, the media guidance application may set the updated advertisement to be the candidate advertisement. For example, the media guidance application may set the updated advertisement to be the candidate advertisement (e.g., the breakfast product advertisement).

The media guidance application may retrieve, from the online database, a candidate advertisement from a plurality of advertisements. For example, the media guidance application may retrieve from an online advertising database a candidate advertisement (e.g., may choose the newest advertisement on the database).

The media guidance application may compare the candidate advertisement with a popularity advertising criteria from the user-specific update criteria. For example, the media guidance application may compare the candidate advertisement (e.g., maybe an advertisement for a soft drink) with a popularity advertising criteria (e.g., may require the advertisement to have been viewed by users at least one million times).

The media guidance application may determine, from the comparison, whether the candidate advertisement meets the popularity advertising criteria. For example, the media guidance application may determine, from the comparison (e.g., the soft drink advertisement has three million views and the popularity advertising criteria requires that the advertisement must have been viewed by users at least one million times) that the candidate advertisement meets the popularity advertising criteria.

In response to determining that the candidate advertisement meets the popularity advertising criteria, the media guidance application may set the updated advertisement to be the candidate advertisement. For example, the media guidance application may set the updated advertisement to be the soft drink advertisement.

In some embodiments, when the media guidance application is retrieving an updated embedded advertisement from an online database using the user-specified update criteria, the media guidance application may retrieve, from the online database, a candidate advertisement from a plurality of advertisements. For example, the media guidance application may retrieve from an online advertising database a candidate advertisement (e.g., may choose the advertisement with the most views on the database).

The media guidance application may determine, from a user profile, preferences for the user. For example, the media guidance application may retrieve user preferences (e.g., user's sports preferences, user's movie preferences, user's shopping preferences, etc.).

The media guidance application may determine, from the preferences for the user, a user-based advertising criteria from the user-specified update criteria. For example, the media guidance application may determine the user-based advertising criteria from the user's social media preferences (e.g., the advertisement should contain a cat, because the user consistently posts on social media about cats).

The media guidance application may compare the candidate advertisement with the user-based advertising criteria. For example, the media guidance application may compare the candidate advertisement (e.g., an advertisement about cat food) with the user-based advertising criteria (e.g., the advertisement should contain a cat).

The media guidance application may determine, from the comparison, whether the candidate advertisement meets the user-based advertising criteria. For example, the media guidance application may determine, from the comparison (e.g., comparing the advertisement about cat food with the user-based advertising criteria the advertisement should contain a cat) that the candidate advertisement (e.g., the cat food advertisement) meets the user-based advertising criteria.

In response to determining that the candidate advertisement meets the user-based advertising criteria, the media guidance application may set the updated advertisement to be the candidate advertisement. For example, the media guidance application may set the updated advertisement to be the cat food advertisement.

In some embodiments, when the media guidance application is retrieving an updated embedded advertisement from an online database using the user-specified update criteria, the media guidance application may retrieve, from the information, updated preferences of the user. For example the media guidance application may retrieve updated preferences for the user (e.g., the user's social media preferences, sports preferences, movie preferences, etc.).

The media guidance application may determine whether the updated preferences of the user are different from the original preferences of the user. For example, the media guidance application may determine by comparing the updated preferences (e.g., the user prefers action movies) to the original preferences (e.g., the user prefers comedic movies) that the updated preferences are different.

In response to determining that the updated preferences for the user are different, the media guidance application may determine an updated user-based advertising criteria from the updated preferences of the user. For example, the media guidance application may determine an updated user-based advertising criteria (e.g., if the advertisement is for a movie, it must be for an action movie) from the updated preferences of the user (e.g., the user prefers action movies).

The media guidance application may compare the candidate advertisement with the updated user-based advertising criteria. For example, the media guidance application may compare the candidate advertisement (e.g., an advertisement for the action movie, The Mummy) with the updated user-based advertising criteria (e.g. if the advertisement is for a movie, it must be for an action movie).

The media guidance application may determine, from the comparison, whether the candidate advertisement meets the updated user-based advertising criteria. For example, the media guidance application may determine, from the comparison, that the candidate advertisement (e.g., an advertisement for the action movie, The Mummy) meets the updated user-based advertising criteria (e.g. if the advertisement is for a movie, it must be for an action movie).

In response to determining that the candidate advertisement meets the updated user-based advertising criteria, the media guidance application may set the updated advertisement to be the candidate advertisement. For example, the media guidance application may set the updated advertisement to be the candidate advertisement (e.g., an advertisement for the action movie, The Mummy).

The media guidance application may replace the embedded advertisement with the updated embedded advertisement in the media asset. For example, the media guidance application may replace the embedded advertisement (e.g., an advertisement for the comedy movie, Bridesmaids) with the updated embedded advertisement (e.g., an advertisement for the action movie, The Mummy).

In some embodiments, when the media guidance application is replacing the embedded advertisement with the updated embedded advertisement in the media asset, the media guidance application may retrieve metadata for the media asset. For example, the media guidance application may retrieve metadata (e.g., title, runtime, date, etc.) for the media asset (e.g., an episode of the television show Chopped).

The media guidance application may determine, from the metadata, a time code corresponding to the time when the advertisement will be playing in the media asset. For example, the media guidance application may determine from the advertising time code metadata a time (e.g., at the 15 minute mark) when the advertisement will be playing in the media asset (e.g. an episode of Chopped).

The media guidance application may set the embedded advertisement to be the updated embedded advertisement. For example, the media guidance application may set the embedded advertisement pointer in the media asset's metadata to point to the storage location of the updated embedded advertisement.

The media guidance application may determine, during playback of the media asset, that the playback reaches the time code. For example, the media guidance application may determine that the episode of Chopped has reached the time code (e.g., the 15 minute mark of playback).

In response to determining that the playback reaches the time code, the media guidance application may pause playback of the media asset and start playback of the updated embedded advertisement. For example, the media guidance application may pause playback of the episode of Chopped after determining that the episode of Chopped has reached the time code (e.g., the 15 minute mark), and start playback of the updated embedded advertisement (e.g., an advertisement for the action movie, The Mummy).

In response to determining that the playback of the updated embedded advertisement has ended, the media guidance application may resume playback of the media asset at the time code. For example, the media guidance application may resume playback of the episode of Chopped after the advertisement ends.

Often, when downloading media content for viewing at a future time, it is difficult to keep advertisements embedded in the downloaded content up-to-date and relevant for the user. Conventional systems may embed advertisements when downloading the media content. However, the conventional systems do not account for updating the embedded advertisements to reflect the user's latest preferences.

Systems and methods are provided for updating advertisements embedded in a media asset scheduled for download at a future time. The media guidance application may receive a request from a user to download a media asset at a first future time, wherein the media asset includes a plurality of embedded advertisements. Based on receiving the request, the media guidance application may download the media asset at the first future time. Based on downloading the media asset at the first future time, at a second future time, the media guidance application may determine, based on a user-specific update criteria, whether an embedded advertisement in the plurality of embedded advertisements needs to be updated. Based on determining that the embedded advertisement needs to be updated, the media guidance application may retrieve an updated embedded advertisement from an online database using the user-specific update criteria. The media guidance application may replace the embedded advertisement with the updated embedded advertisement in the media asset.

The systems and methods described herein update advertisements to reflect the user's current preferences, in order to keep the advertising content embedded in the media asset up-to-date and relevant to the user.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
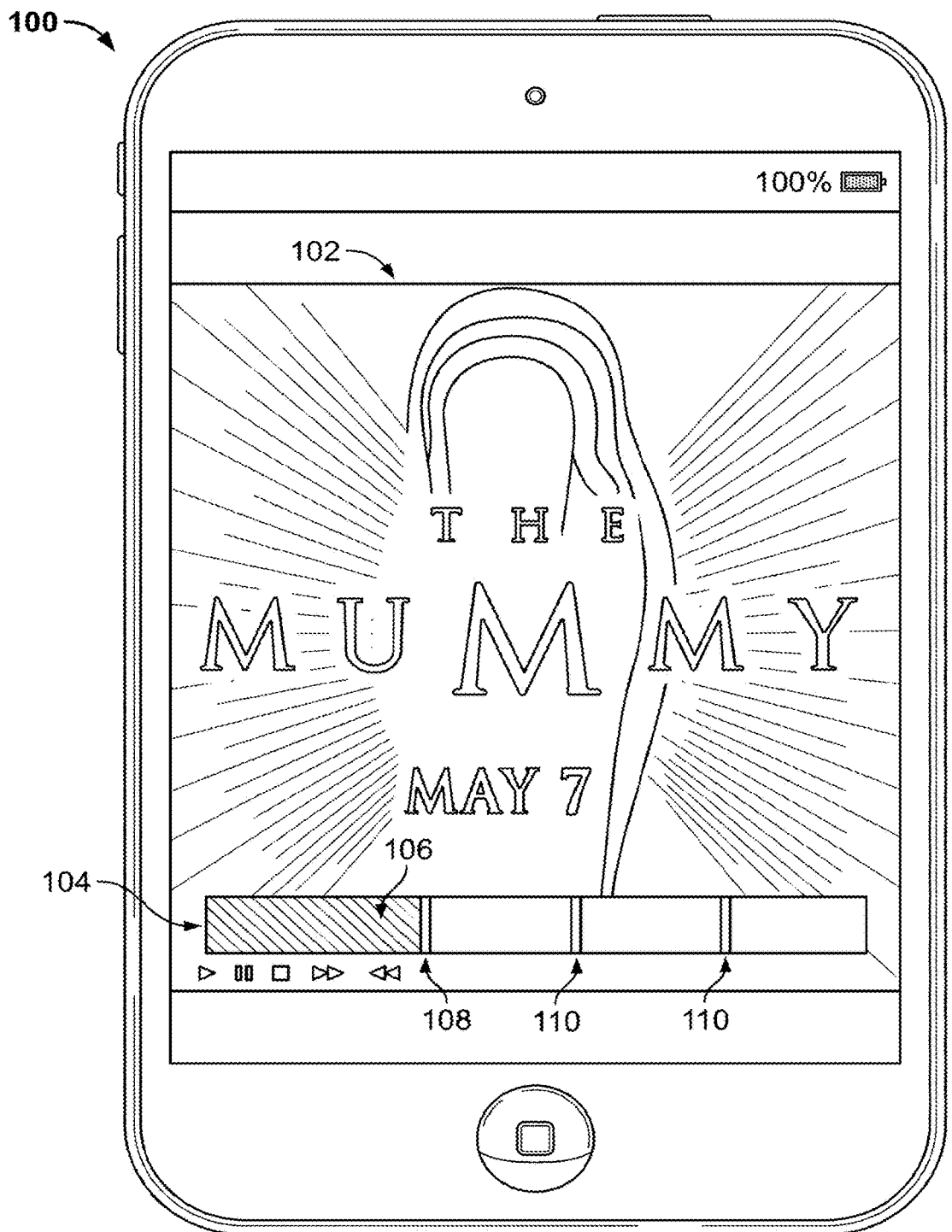
FIG. 1 depicts an illustrative embodiment of a display screen of user equipment that is playing back an advertisement, in accordance with some embodiments of the disclosure.

FIG. 1 depicts an illustrative embodiment of user equipment that is playing back a media asset, in accordance with some embodiments of the disclosure. FIG. 1 depicts playback of media asset 102 on user equipment 100, which may be presented by control circuitry that executes a media guidance application on any user equipment. The functionality of user equipment, control circuitry, and the media guidance application is described in further detail with respects to FIGS. 2-5.

The media guidance application may playback media asset 102 on user equipment 100, which may occur when a user requests to playback media asset 102. The media guidance application may generate trick play bar 104 that allows the viewer to access playback features (e.g., play, pause, stop, rewind, fast-forward, etc.). The media guidance application may generate progress bar 106 that is contained inside trick play bar 104, which corresponds to a viewer's current progress point in the playback of media asset 102. Time code 108 may be the first time during playback of media asset 102 where an advertisement is played. The media guidance application may determine time code 108 from the metadata of media asset 102. Time code 110 may be subsequent times after time code 108 where advertisements are played during playback of media asset 102.

In some embodiments, a media guidance application may receive a request from a user to download a media asset at a first future time, where the media asset includes a plurality of embedded advertisements. For example, the media guidance application may receive a request from a user to download an episode of the Food Network series Chopped at a first future time (e.g., 24 hours in the future), where the episode of Chopped includes embedded advertisements. Manners in which the media guidance application may receive a request from a user to access a media asset, whether a linear, scheduled media asset or a non-linear media asset, are further discussed below with respect to FIGS. 2-5.

In some embodiments, the media guidance application may generate a prompt to be displayed on user equipment 100, where the prompt allows the user to choose from a selection of times, a viewing time in the future. For example, the media guidance application may generate a selectable prompt, which may be displayed as an overlay on user equipment 100 that says "Pick a preferred viewing time." The media guidance application may generate default selectable times, to be displayed as selection choices in the prompt for the user. In response to a user selecting a selectable time in the prompt, the media guidance application may determine a first future time prior to the user's chosen selectable time to download the media asset.

In some embodiments, the media guidance application may determine the first future time to download a media asset by retrieving, from a profile for the user, preferences for the user. The media guidance application may determine from the preferences for the user a preferred time length prior to the viewing time when the user prefers to download the media asset. For example, the media guidance application may retrieve, from the profile, the user's preferred time length prior to the viewing time when the user prefers to download the media asset (e.g., may be three hours prior to the viewing time). The media guidance application may determine the first future time by subtracting the preferred time length from the chosen viewing time. For example, the media guidance application may determine, from input from the user, that the chosen viewing time is Saturday at 10:00 μm. The media guidance application may determine the first future time by calculating, by subtracting the preferred time length (e.g., 3 hours) from the chosen viewing time (e.g., Saturday at 10:00 pm); the media guidance application may determine that the first future time is Saturday at 7:00 pm.

Based on receiving the request, the media guidance application may download the media asset at the first future time. The media guidance application may retrieve the media asset from a database and download and store it on a hard drive. Manners in which the media guidance application may download a media asset, whether a linear, scheduled media asset or a non-linear media asset, are further discussed below with respect to FIGS. 2-5. For example, the media guidance application may download and store (e.g., on a hard drive) an episode of Chopped at the first future time (e.g., the first future time may be 24 hours from the user request).

In some embodiments, when the media guidance application downloads the media asset at the first future time, the media guidance application may retrieve advertisements from the online database based on a user-specific update criteria. For example the media guidance application may retrieve advertisements from an online advertising database based on a user-specific update criteria (e.g., may retrieve advertisements based on user preferences, popularity, etc.). The media guidance application may determine the user-specific update criteria and retrieve advertisements from the online advertising database using the methods described below.

The media guidance application may embed the advertisements into the media asset. For example, the media guidance application may embed advertisements into the media asset (e.g., an episode of Chopped) at different points in the media asset. The media guidance application may embed advertisements into the media asset using similar methods as the methods for updating advertisements in the media asset described below.

The media guidance application may download the media asset at the first future time. The methods by which the media guidance application may download the media asset are further discussed below with respect to FIGS. 2-5. For example, the media guidance application may download an episode of Chopped at the first future time (e.g., the first future time may be 48 hours from the user request).

In some embodiments, the media guidance application may determine that the advertisements embedded in the media asset need to be updated. For example, the media guidance application may determine after a length of time has passed, that the advertisements are old or irrelevant to the user.

Based on downloading the media asset at the first future time, at a second future time, the media guidance application may determine, based on a user-specific update criteria, whether an embedded advertisement in the plurality of embedded advertisements needs to be updated, as described in more detail below. For example, the media guidance application may determine that an embedded advertisement (e.g., an advertisement for the Olympics) needs to be updated based on a user-specific update criteria (e.g., no sports advertisements).

In some embodiments, the media guidance application may determine the second future time by retrieving, from the profile, the user's preferred update-checking frequency. For example, the media guidance application may retrieve, from the profile, the user's preferred update-checking frequency (e.g., may be every 24 hours). The media guidance application may calculate the second future time from the user's preferred update-checking frequency and the first future time. For example, the media guidance application may determine the second future time (e.g., Saturday at 4:00 pm) by adding the update-checking frequency (e.g., 24 hours) to the first future time (e.g., Friday at 4:00 pm).

In some embodiments, the media guidance application may determine the second future time dynamically. The media guidance application may monitor, after the first future time, for a request from the user to access a network server. For example, the media guidance application may monitor for a request for the user to access a network server (e.g., the user may request to access a web page, the user may request to access content on a remote server, etc.). The media guidance application may determine that the second future time is the moment when the user requests to access the network server.

In some embodiments, when based on downloading the media asset at the first future time, at a second future time, the media guidance application may determine, based on a user-specified update criteria, whether an embedded advertisement in the plurality of embedded advertisements needs to be updated, the media guidance application may retrieve, from a user profile, user viewing history data. For example, the media guidance application may retrieve the user's viewing history data (e.g., a list of media content the user has previously viewed) from the user profile.

The media guidance application may determine that the user-specified update criteria is composed of different criterion, which may be derived from the user preferences, user social media data, time-of-day data, popularity preferences, or any other relevant criterion data. Specific criterion for the user-specific update criteria are described in more detail below.

In some embodiments, the media guidance application may use, from the user-specified update criteria, a previously-viewed criterion to determine if the user previously viewed the media asset, and thus the advertisement. If the user previously viewed the advertisement, updating the advertisement with a new, unviewed advertisement may keep the media asset more relevant and up-to-date for the user.

The media guidance application may determine, from the user viewing history data, whether the user viewed the media asset. As described herein, "viewing history data" is defined to mean a data indicative of media assets that have been consumed by the user. The media guidance application may retrieve, from the profile, the user's viewing history data. The media guidance application may compare metadata for the media asset to the user's viewing history data, to determine whether there is a match. Based on finding a match, the media guidance application may determine that the user has viewed the media asset. For example, the media guidance application may determine whether the user has previously viewed the media asset (e.g., an episode of Chopped) by retrieving the user's viewing history data from the profile. The media guidance application may then compare the media asset's title (e.g., an episode of Chopped titled "Oodles of Noodles") from the metadata to the user viewing history data to determine if the user has viewed the media asset. Based on determining a match exists, the media guidance application may determine that the user viewed the media asset (e.g., an episode of Chopped titled "Oodles of Noodles").

In response to determining that the user has viewed the media asset, the media guidance application may determine that the embedded advertisement in the media asset needs to be updated. For example, the media guidance application may determine, from the user viewing history data, whether the user has viewed the media asset (e.g., the episode of Chopped, "Oodles of Noodles"). The media guidance application may determine that the advertisements in the episode of Chopped, "Oodles of Noodles" have already been seen by the user, and thus need to be updated.

In some embodiments, the media guidance application may use, from the user-specified update criteria, a threshold-time criterion to determine if the advertisement needs to be updated. The threshold-time criterion ensures that the user's advertisements are kept up-to-date by updating advertisements after they have reached a certain age. This allows advertisements embedded in the media asset to be recent and relevant to the user.

In some embodiments, when based on downloading the media asset at the first future time, at a second future time, the media guidance application may determine, based on a user-specified update criteria, whether an embedded advertisement in the plurality of embedded advertisements needs to be updated, the media guidance application may retrieve, from a user profile, a threshold period of time. For example, the media guidance application may retrieve a threshold period of time (e.g., may be 7 days) from the user profile that corresponds to an amount of time before an advertisement is expired.

In some embodiments, the media guidance application may determine that the threshold period of time is a default value that may be adjusted based on user input. The media guidance application may retrieve the default threshold period of time from an online advertising database. The media guidance application may store the default threshold period of time for the embedded advertisement in the user profile.

For example, the media guidance application may retrieve the default threshold period of time from an online advertising database (e.g., maybe 30 days for all advertisements stored in the online advertising database). The media guidance application may store this threshold period of time in the user profile.

In some embodiments, the media guidance application may retrieve the default threshold period of time from the metadata of the embedded advertisement. The media guidance application may store the default threshold period of time for the embedded advertisement in the user profile. For example, the media guidance application may retrieve, from the metadata of the embedded advertisement, the expiration date of the advertisement (e.g., it may expire one week after being downloaded from the online advertisement database). The media guidance application may store the expiration date of the advertisement as the default threshold period of time in the user profile. The media guidance application may also receive user input (e.g., the user may access the user profile and add or subtract time to the threshold period of time) to adjust the threshold period of time.

The media guidance application may retrieve, from metadata for the embedded advertisement, an age of the embedded advertisement. As referred to herein, the term "age" should be understood to mean the date the advertisement was available to the public, which may correspond to the date the advertisement was accessible on the online advertising database. For example, the media guidance application may retrieve, from the embedded advertisement's metadata, the advertisement's age, which may correspond to the date the advertisement was first added to the online advertisement database.

The media guidance application may compare the age of the embedded advertisement with the threshold period of time. For example, the media guidance application may compare the age of the embedded advertisement (e.g., maybe 14 days) with the threshold period of time (e.g., maybe 30 days).

In response to determining that the age of the embedded advertisement exceeds the threshold period of time, the media guidance application may determine that the embedded advertisement in the media asset needs to be updated.

For example, the media guidance application may retrieve, from the metadata for the embedded advertisement, the age of the embedded advertisement (e.g. maybe 60 days). The media guidance application may compare the age of the embedded advertisement with the threshold period of time, which may be determined using the methods described above. In response to determining that the advertisement's age exceeds the threshold period of time (e.g., maybe 30 days), the media guidance application may then determine that the embedded advertisement in the media asset needs to be updated.

In some embodiments, the media guidance application may use, from the user-specified update criteria, a user-based advertising to determine if the advertisement needs to be updated. The user-preference criterion ensures that the user's advertisements are kept up-to-date by updating advertisements if the content of the advertisement is not of interest to the user, as determined by the user preferences. This allows advertisements embedded in the media asset to be recent and relevant to the user.

In some embodiments, when based on downloading the media asset at the first future time, at a second future time, the media guidance application may determine, based on a user-specified update criteria, whether an embedded advertisement in the plurality of embedded advertisements needs to be updated, the media guidance application may determine, for a user profile, preferences for the user. For example, the media guidance application may determine the user's preferences (e.g., the user's social media preferences, online shopping preferences, etc.) from the user profile.

The media guidance application may determine from the preferences for the user, a user-based advertising criteria. For example, the media guidance application may determine from the user's preferences (e.g., the user loves online shopping, etc.) that the user-based advertising criteria may contain a criterion that the advertisement must be shopping-related.

In some embodiments, the media guidance application may determine the different criterion in the user-based advertising criteria based on user input. For example, the media guidance application may generate a prompt with selectable choices (e.g., an overlay to be displayed on user equipment 100) that allows the user to choose the types of advertisements they would prefer to view when watching media assets. For example, the media guidance application may generate a prompt (e.g., an overlay that states, "What type of advertisement would you like to see?") with a selectable choices (e.g., "Shopping," "Entertainment,"

"Travel" etc.). Based on the choices the user selects (e.g., using a remote controller, a mouse, etc.), the media guidance application may determine the different criterion in the user-based advertising criterion (e.g., the user selects "Shopping," and "Entertainment," so the user-based advertising criteria may include criteria where the advertisement must include content related to shopping and/or entertainment).

In some embodiments, the media guidance application may determine the user-based advertising criteria by retrieving, from the profile, rankings for each preference in the user profile (e.g., high, medium, low). The media guidance application may determine that a subset of the preferences (e.g., the preferences ranked "high"), comprise a user-based advertising criteria. For example, the media guidance application may retrieve, from the profile, rankings for each user preference (e.g., shopping preferences, social media preferences, entertainment preferences, etc.). The media guidance application may determine a subset of the preferences (e.g., the preferences ranked "high"), and determine that the user-based advertising criteria requires that the advertisement must meet one of the preferences ranked "high." For example, the media guidance application may determine that the user preferences "shopping," "entertainment," and "sports" are ranked "high." The media guidance application may determine, from the rankings, that the user-based advertising criteria include the requirements that the advertisement must fall into either the "shopping," "entertainment," or "sports" category.

The media guidance application may compare the embedded advertisements with the user-based advertising criteria. For example, the media guidance application may determine the user-based advertising criteria based on the methods described above (e.g., the advertisement must be shopping-related because the only user preference ranked "high" is shopping). The media guidance application may compare the embedded advertisement (e.g., the content description from the metadata for the embedded advertisement) with the user-based advertising criteria (e.g., the advertisement must be shopping-related).

The media guidance application may determine, from the comparison, whether the embedded advertisement meets the user-based advertising criteria. For example, the media guidance application may determine, from the comparison, that the advertisement (e.g., the content description may state that the advertisement is for the Olympics) does not meet the user-based advertising criteria (e.g., that the advertisement must be shopping-related).

In response to determining that the embedded advertisement does not meet the user-based advertising criteria, the media guidance application may determine that the embedded advertisement in the media asset needs to be updated. For example, in response to the media guidance application determining that an Olympics-related advertisement does not meeting the user-based advertising criteria (e.g., that the advertisement must be shopping related), the media guidance application may determine that the embedded advertisement in the media asset needs to be updated.

After determining, using the methods described above, that the embedded advertisement needs to be updated, the media guidance application may update the embedded advertisement in the media asset with an updated embedded advertisement, as described below.

The media guidance application may replace the embedded advertisement with the updated embedded advertisement in the media asset. For example, the media guidance application may replace the advertisements that the user has already viewed in an episode of chopped with updated advertisements (e.g., new advertisements that the user has not previously viewed), using the methods described below.

Based on determining that the embedded advertisement needs to be updated, the media guidance application may retrieve an updated embedded advertisement from an online database using the user-specified update criteria. For example, the media guidance application may retrieve an updated embedded advertisement (e.g., an advertisement for a music streaming service, such as SPOTIFY) using the user-specified update criteria (e.g., the user enjoys advertisements about music).

In some embodiments, when the media guidance application is retrieving an advertisement from the online advertisement database, the media guidance may retrieve a candidate advertisement from the online advertisement database. The media guidance application may choose a candidate advertisement due to the volume of advertisements available on the online advertisement database.

In some embodiments, the media guidance application may retrieve a candidate advertisement from the online advertisement database based on choosing a new advertisement from the online advertisement database. The media guidance application may retrieve the advertisement on the online database that has the newest upload time and date. For example, the media guidance application may retrieve an advertisement from the online advertisement database that has the newest upload time and date (e.g., was uploaded to the online advertisement database 2 minutes ago) to be the candidate advertisement.

In some embodiments, the media guidance application may retrieve a candidate advertisement from the online advertisement database based on choosing the advertisement on the online advertisement database that is highly viewed. As described herein, "highly viewed" is defined to mean an advertisement that has a threshold minimum amount of views, wherein the threshold minimum amount is found in the user profile. The media guidance application may determine that an advertisement is highly viewed by retrieving, from the online advertisement database, the view counts for each advertisement on the database. The media guidance application may compare the view counts for each advertisement in the database to the threshold minimum amount from the media guidance data. The media guidance application may choose and advertisement that exceeds the threshold minimum amount to be the candidate advertisement. For example, the media guidance application may retrieve the threshold minimum amount of views from the media guidance data (e.g., the threshold minimum amount may be one million views). The media guidance application may retrieve an advertisement from the online advertisement database that has more views than the threshold minimum amount (e.g., more than one million views) to be the candidate advertisement.

In some embodiments, the media guidance application may retrieve a candidate advertisement from the online advertisement database. The media guidance application may determine that the candidate advertisement is a default advertisement determined by the online advertising database. For example, the media guidance application may retrieve a default candidate advertisement from the online advertising database that was chosen by the online advertising database.

The media guidance application may retrieve, from the online database, a candidate advertisement from a plurality of advertisements. The media guidance application may retrieve the candidate advertisement from the online advertising database using the methods described above. For example, the media guidance application may retrieve from an online advertising database a candidate advertisement to be a new advertisement (e.g., may choose the newest advertisement on the database).

The media guidance application may compare a candidate advertisement to a time-of-day advertising criteria found in the user-specific update criteria to determine if the candidate advertisement may be relevant to the user, and thus a good candidate embed into the media asset.

The media guidance application may compare the candidate advertisement with a time-of-day advertising criteria from the user-specific update criteria. The media guidance application may retrieve the time-of-day advertising criteria from the user profile, based on the time when the user plans to view the media asset.

In some embodiments, when the media guidance application is retrieving an updated embedded advertisement from an online database using the user-specified update criteria, the media guidance application may receive, from the user, a time at which the user plans to view the media asset. For example, the media guidance application may receive an input (e.g., the user entering a viewing time using keyboard commands) from the user corresponding to a time when the user plans to view the media asset (e.g., the user entering "July 14 at 8:00 pm").

As another example, the media guidance application may generate a prompt, which may be displayed as an overlay on user equipment 100, (e.g., an overlay that states "Preferred viewing time:") that has selectable times (e.g., "Wednesday at 8:00 pm," "Saturday at 2:30 pm," etc.). The media guidance application may receive a selection from the user (e.g., the user choosing, using remote control commands, keyboard commands, or a computer mouse, etc., a selectable time) corresponding to a time when the user plans to view the media asset.

In some embodiments, the media guidance application may determine that the time-of-day advertising criteria is different based on the time of day (e.g., a different criterion for the morning, afternoon, evening, and night). The media guidance application may retrieve, the corresponding time-of-day advertising criteria, from the user profile, based on the time when the user plans to view the media asset. The different criterion based on the time of day may be chosen based on user preferences. For example, the media guidance application may determine, from the user preferences (e.g., the user's social media data), that the user prefers to view cooking-related content in the morning and afternoon, but not at night. The media guidance application may then determine a time-of-day criterion that requires that cooking-related advertisements may only be shown when the user's chosen viewing time is during the morning or afternoon. The media guidance application may compare the candidate advertisement with the time-of-day advertising criteria. For example, the media guidance application may compare the candidate advertisement (e.g., maybe an advertisement for a breakfast product) with a time-of-day criteria (e.g., advertisements related to the morning are shown only if the user's planned viewing time takes place between 5:00 am-12:00 pm).

The media guidance application may determine, from the comparison, whether the candidate advertisement meets the time-of-day advertising criteria. For example, the media guidance application may determine, from the comparison, that the candidate advertisement (e.g., an advertisement for a breakfast product) meets the time-of-day criteria (e.g., advertisements related to the morning are shown only if the user's planned viewing time takes place between 5:00 am-12:00 pm).

In response to determining that the candidate advertisement meets the time-of-day advertising criteria, the media guidance application may set the updated advertisement to be the candidate advertisement. The media guidance application may set the updated advertisement to be the candidate advertisement by setting an advertisement pointer, found in the metadata of the media asset, to point to the candidate advertisement's entry in the database, wherein the advertisement pointer previously pointed to the original embedded advertisement in the database. For example, the media guidance application may set the updated advertisement to be the candidate advertisement (e.g., the breakfast product advertisement) by updating an advertisement pointer in the media asset's metadata to point towards the candidate advertisement's entry in the database.

In some embodiments, the media guidance application may compare a candidate advertisement to a popularity advertising criteria found in the user-specific update criteria to determine if the candidate advertisement may be relevant to the user, and thus a good candidate embed into the media asset.

In some embodiments, the media guidance application may retrieve, from the online database, a candidate advertisement from a plurality of advertisements, using the methods described above. For example, the media guidance application may retrieve from an online advertising database a candidate advertisement (e.g., may choose the newest advertisement on the database). The media guidance application may compare the candidate advertisement with a popularity advertising criteria from the user-specific update criteria. The media guidance application may retrieve the popularity advertising criteria from the user profile.

In some embodiments, the media guidance application may determine that the popularity advertising criteria requires that the candidate advertisement be a viral advertisement. As described herein, a "viral advertisement" is defined to mean an advertisement whose view count increases rapidly in a short period of time. The media guidance application may determine that the candidate advertisement is a viral advertisement by retrieving, from the online advertising database, viewing history data for the candidate advertisement. The media guidance application may determine, from the viewing history data, how quickly the candidate advertisement gained views. The media guidance application may determine that the candidate advertisement is a viral advertisement if the candidate advertisement gained the majority of the views (e.g., more than 50% of the total views) in a short amount of time (e.g., maybe 24 hours), where the short amount of time is a default value found in the media guidance data, which may be adjusted based on user input. For example, the media guidance application may determine that the candidate advertisement is a viral advertisement by retrieving its viewing history data from the online advertisement database. The media guidance application may determine that out of the candidate advertisement's ten million views, eight million of the views took place in the last 48 hours. The media guidance application may determine, from the default value in the media guidance data, that the short amount of time is 7 days. The media guidance application may determine that 48 hours is within the 7 day time length, and because the candidate advertisement received the majority of its views during the 48 hours, the candidate advertisement is a viral advertisement.

In some embodiments, the media guidance application may determine that the popularity advertising criteria requires that the candidate advertisement be within a top threshold amount of views on the online advertisement database. The media guidance application may retrieve the top threshold amount from a default top threshold amount of views value in the media guidance data, which may be adjustable by user input. For example, the media guidance application may retrieve a default top threshold amount of views (e.g., maybe ten million views) from the media guidance data. The media guidance application may compare the candidate advertisement (e.g., one hundred million views) with the top threshold amount of views (e.g., ten million views). For example, the media guidance application may compare the candidate advertisement (e.g., maybe an advertisement for a soft drink viewed ten million times) with a popularity advertising criteria (e.g., may require the advertisement to have been viewed by users at least one million times).

The media guidance application may determine, from the comparison, whether the candidate advertisement meets the popularity advertising criteria. For example, the media guidance application may determine, from the comparison (e.g., the soft drink advertisement has three million views and the popularity advertising criteria requires that the advertisement must have been viewed by users at least one million times) that the candidate advertisement meets the popularity advertising criteria.

In response to determining that the candidate advertisement meets the popularity advertising criteria, the media guidance application may set the updated advertisement to be the candidate advertisement, using similar methods as described above. For example, the media guidance application may set the updated advertisement to be the soft drink advertisement by updating an advertisement pointer in the media asset's metadata to point towards the candidate advertisement's entry in the database.

In some embodiments, when the media guidance application is retrieving an updated embedded advertisement from an online database using the user-specified update criteria, the media guidance application may retrieve, from the online database, a candidate advertisement from a plurality of advertisements. For example, the media guidance application may retrieve from an online advertising database a candidate advertisement (e.g., may choose the advertisement with the most views on the database). The media guidance application may compare the candidate advertisement with the user-based advertising criteria from the user-specific update criteria, as described in detail above. The media guidance application may retrieve the popularity advertising criteria from the user profile.

The media guidance application may determine, from a user profile, preferences for the user. For example, the media guidance application may retrieve user preferences (e.g., user's sports preferences, user's movie preferences, user's shopping preferences, etc.).

The media guidance application may determine, from the preferences for the user, a user-based advertising criteria from the user-specified update criteria, as described in detail above.

The media guidance application may compare the candidate advertisement with the user-based advertising criteria. For example, the media guidance application may compare the candidate advertisement (e.g., an advertisement about cat food) with the user-based advertising criteria (e.g., the user's preferences for cats are ranked "high," and thus the advertisement should contain a cat).

The media guidance application may determine, from the comparison, whether the candidate advertisement meets the user-based advertising criteria. For example, the media guidance application may determine, from the comparison (e.g., comparing the advertisement about cat food with the user-based advertising criteria the advertisement should contain a cat) that the candidate advertisement (e.g., the cat food advertisement) meets the user-based advertising criteria.

In response to determining that the candidate advertisement meets the user-based advertising criteria, the media guidance application may set the updated advertisement to be the candidate advertisement, using similar methods as described above. For example, the media guidance application may set the updated advertisement to be the cat food advertisement by updating an advertisement pointer in the media asset's metadata to point towards the candidate advertisement's entry in the database.

In some embodiments, when determining whether to update the embedded advertisements, the media guidance application may determine if the user-based advertising criteria has changed since the last time the media guidance application accessed it. The media guidance application may determine if the user-based advertising criteria has changed by determining if the user's preferences have changed.

In some embodiments, the media guidance application may determine periodically if the user's user-based advertising criteria has changed. The media guidance application may retrieve a default period of time from the media guidance data, which may be adjustable by the user. The media guidance application may determine from the default period of time how frequently to check to determine if the user's user-based advertising criteria has changed, using the methods described below. For example, the media guidance application may retrieve from the media guidance data a default period of time (e.g, maybe 3 days), and the media guidance application may determine from the default period of time to check every 3 days to determine if the user's user-based advertising criteria has changed, using the methods described below.

In some embodiments, the media guidance application may determine if the user's user-based advertising criteria has changed whenever the media guidance application accesses the online advertisement database. For example, if the media guidance application accesses the online database to search for a candidate advertisement, the media guidance application may check to determine if the user's user-based advertising criteria have changed, based on the methods described below.

In some embodiments, when the media guidance application is retrieving an updated embedded advertisement from an online database using the user-specified update criteria, the media guidance application may retrieve, from the information, updated preferences of the user. For example, the media guidance application may retrieve updated preferences for the user (e.g., the user's social media preferences, sports preferences, movie preferences, etc.).

The media guidance application may determine whether the updated preferences of the user are different from the original preferences of the user. For example, the media guidance application may determine by comparing the updated preferences (e.g., the user prefers action movies) to the original preferences (e.g., the user prefers comedic movies) that the updated preferences are different.

In response to determining that the updated preferences for the user are different, the media guidance application may determine an updated user-based advertising criteria from the updated preferences of the user, using similar methods as described above. For example, the media guidance application may determine an updated user-based advertising criteria (e.g., if the advertisement is for a movie, it must be for an action movie) from the updated preferences of the user (e.g., the user prefers action movies).

The media guidance application may compare the candidate advertisement with the updated user-based advertising criteria. For example, the media guidance application may compare the candidate advertisement (e.g., an advertisement for the action movie, The Mummy) with the updated user-based advertising criteria (e.g. if the advertisement is for a movie, it must be for an action movie).

The media guidance application may determine, from the comparison, whether the candidate advertisement meets the updated user-based advertising criteria. For example, the media guidance application may determine, from the comparison, that the candidate advertisement (e.g., an advertisement for the action movie, The Mummy) meets the updated user-based advertising criteria (e.g. if the advertisement is for a movie, it must be for an action movie).

In response to determining that the candidate advertisement meets the updated user-based advertising criteria, the media guidance application may set the updated advertisement to be the candidate advertisement. For example, the media guidance application may set the updated advertisement to be the candidate advertisement (e.g., an advertisement for the action movie, The Mummy).

The media guidance application may replace the embedded advertisement with the updated embedded advertisement in the media asset, using the methods described above. For example, the media guidance application may replace the embedded advertisement (e.g., an advertisement for the comedy movie, Bridesmaids) with the updated embedded advertisement (e.g., an advertisement for the action movie, The Mummy); the media guidance application may set the embedded advertisement pointer in the media asset's metadata (e.g., currently pointing to the advertisement for the comedy movie, Bridesmaids) to point to the storage location of the updated embedded advertisement (e.g., the advertisement for the action movie, The Mummy).

After determining the candidate advertisement to use as the updated advertisement, the media guidance application may replace the embedded advertisement with the updated embedded advertisement. The media guidance application may retrieve the updated embedded advertisement from the online advertisement database and download and store it on a hard drive. Manners in which the media guidance application may download an advertisement are further discussed below with respect to FIGS. 2-5.

In some embodiments, when the media guidance application is replacing the embedded advertisement with the updated embedded advertisement in the media asset, the media guidance application may retrieve metadata for the media asset. For example, the media guidance application may retrieve metadata from the database (e.g., title, runtime, date, etc.) for the media asset (e.g., an episode of the television show, Chopped).

The media guidance application may determine, from the metadata, a time code corresponding to the time when the advertisement will be playing in the media asset. The media guidance application may retrieve a time code data structure from the metadata, where the time code data structure contains multiple time codes each corresponding to an inserting point in the media asset where an advertisement will be played. The media guidance application may retrieve the first entry in the time code data structure, which may correspond to time code 108. Subsequent entries in the time code data structure may correspond to time code 110. For example, the media guidance application may retrieve the time code data structure from the metadata for the media asset (e.g., an episode of the television show, Chopped). The media guidance application may retrieve the entry in the time code data structure (e.g., timecode1:6:45) corresponding to the embedded advertisement, and determine from the time code entry a time when the embedded advertisement will be playing in the media asset (e.g., an advertisement will play in the episode of Chopped at the 6 minute and 45 second mark of playback).

The media guidance application may set the embedded advertisement to be the updated embedded advertisement. For example, the media guidance application may set the embedded advertisement pointer in the media asset's metadata to point to the storage location of the updated embedded advertisement.

The media guidance application may determine, during playback of the media asset, that the playback reaches the time code. The media guidance application may flag the playback to automatically pause when reaching the time code. For example, the media guidance application may determine that the episode of Chopped has reached the time code based on reaching a flag in playback corresponding to time code (e.g., the time code is at 15 minute mark of playback).

In response to determining that the playback reaches the time code, the media guidance application may pause playback of the media asset and starting playback of the updated embedded advertisement. For example, the media guidance application may pause playback of the episode of Chopped after determining that the episode of Chopped has reached the time code (e.g., the 15 minute mark), and start playback of the updated embedded advertisement (e.g., an advertisement for the action movie, The Mummy).

In response to determining that the playback of the updated embedded advertisement has ended, the media guidance application may resume playback of the media asset at the time code. The media guidance application may resume playback of the media asset at the flag in playback. For example, the media guidance application may resume playback at the flagged spot in playback of the episode of Chopped after the advertisement ends.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
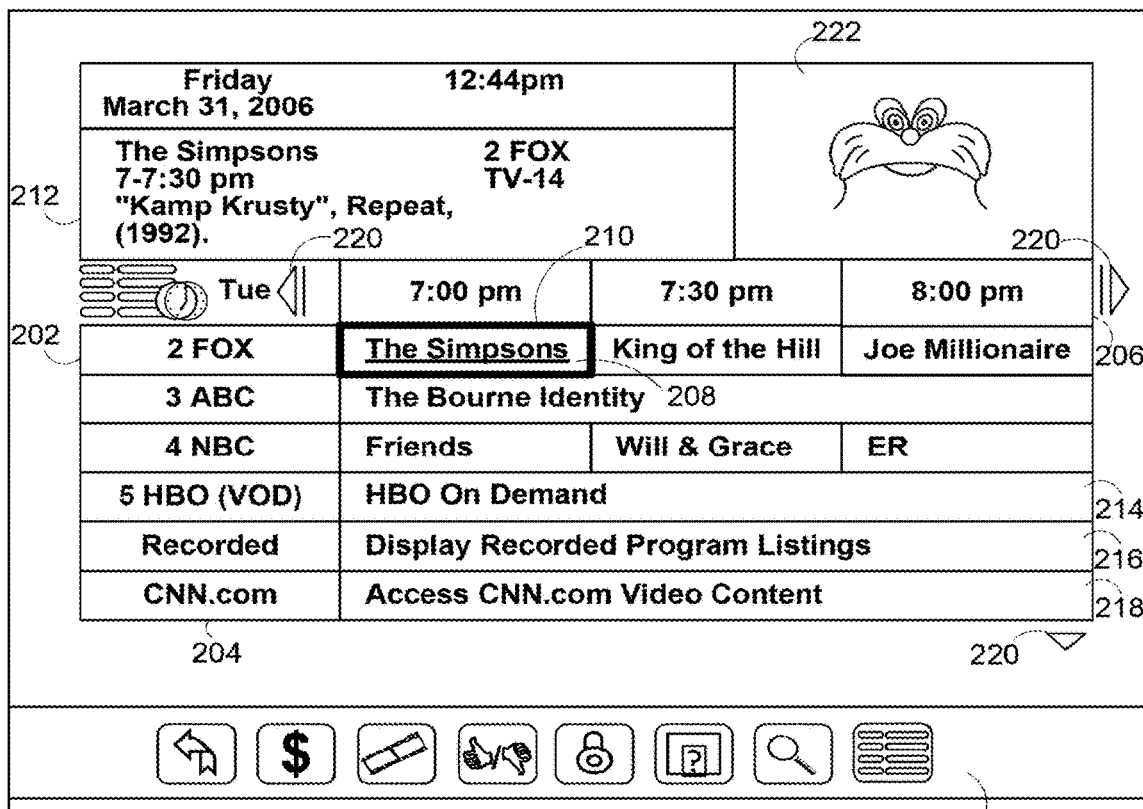
FIG. 2 shows an illustrative embodiment of a display screen that may be used to provide media guidance application listings and other media guidance information, in accordance with some embodiments of the disclosure.
Figure 3:
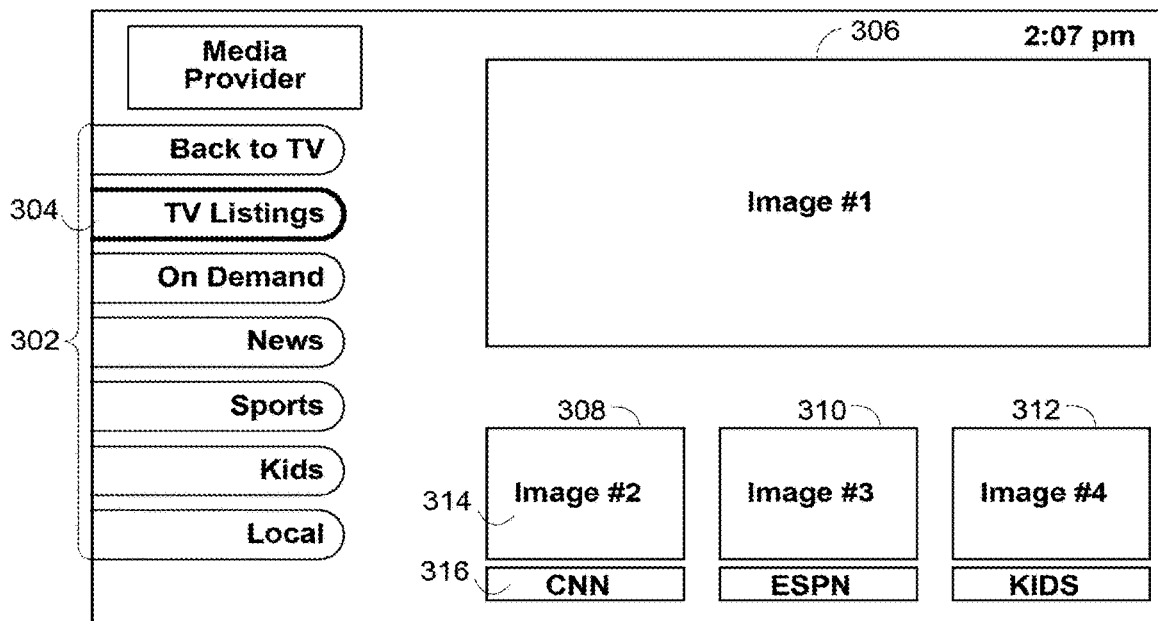
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
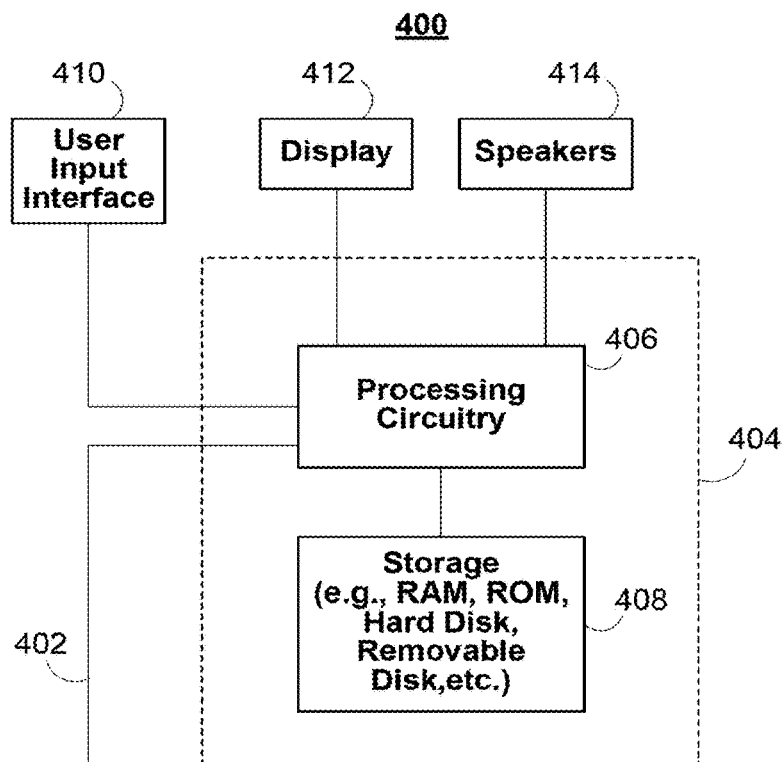
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays.

For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
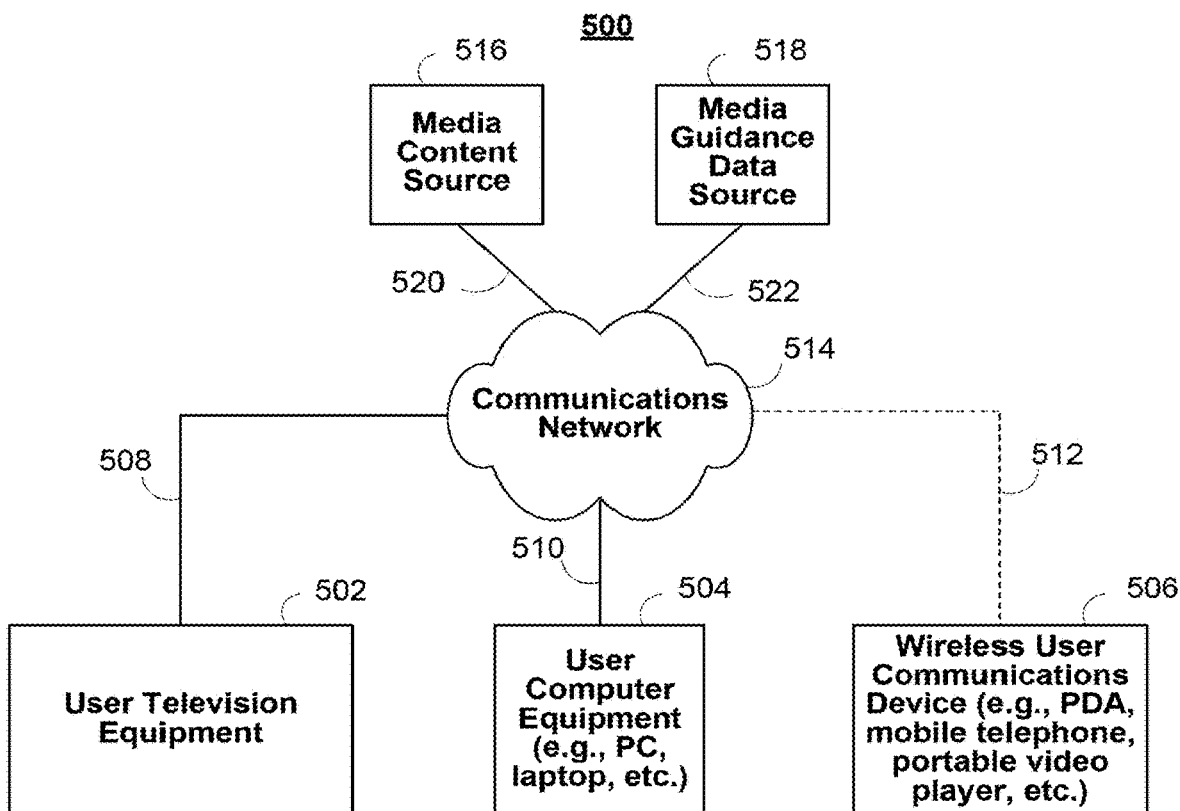
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
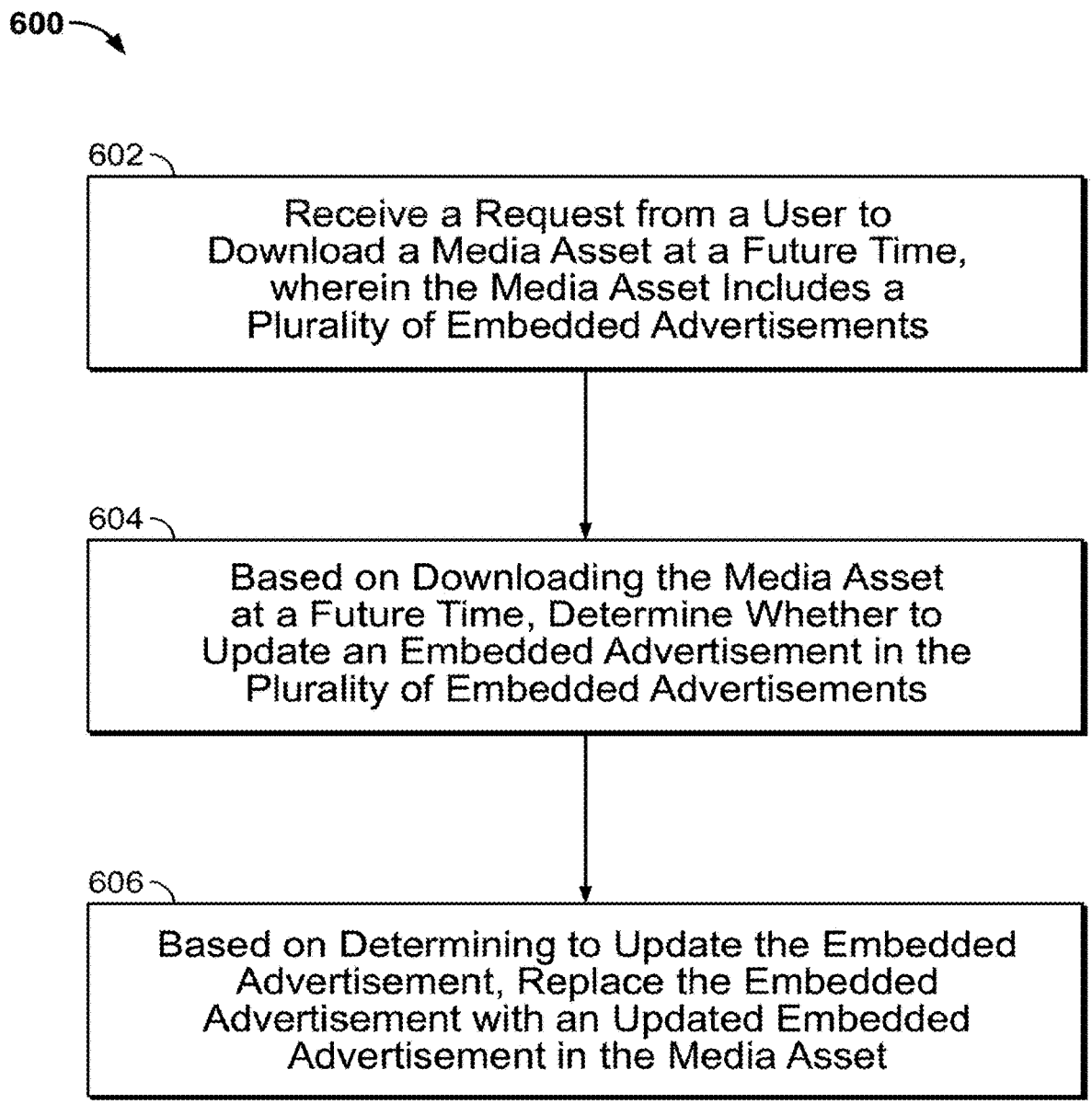
FIG. 6 depicts an illustrative flowchart of a process for determining whether to update an embedded advertisement in a media asset.

FIG. 6 depicts an illustrative flowchart of a process for determining whether to update an embedded advertisement in a media asset, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 100, which may have any or all of the functionality of user television equipment 502, user computer equipment 504, and/or wireless communications device 506), or of a remote server separated from the user equipment by way of communication network 514.

Process 600 begins at 602, where control circuitry 404 receives a request from a user to download a media asset at a future time, where the media asset includes a plurality of embedded advertisements. For example, control circuitry 404 may receive user input by way of user input interface 410. At 604, based on downloading the media asset at a future time, control circuitry 404 determines whether to update an embedded advertisement in the plurality of embedded advertisements. Control circuitry 404 determines whether to update an embedded advertisement in the plurality of embedded advertisements in the same manner described above with respect to FIG. 1. For example, control circuitry 404 may determine to update the embedded advertisement by determining from metadata for the embedded advertisement from media guidance data source 518 that the age of the embedded advertisement is too old, in the same manner described above with respect to FIG. 1. At 606, based on determining to update the embedded advertisement, control circuitry 404 replaces the embedded advertisement with an updated embedded advertisement in the media asset. Control circuitry 404 retrieves the updated embedded advertisement from media content source 516. Control circuitry 404 stores the updated embedded advertisement from media content 516 in storage 408. For example, control circuitry 404 may replace the embedded advertisement with the updated advertisement by setting an advertisement pointer in the metadata of the media asset, retrieved from media guidance data source 518, to point to the location in storage 408 of the updated embedded advertisement.

Figure 7:
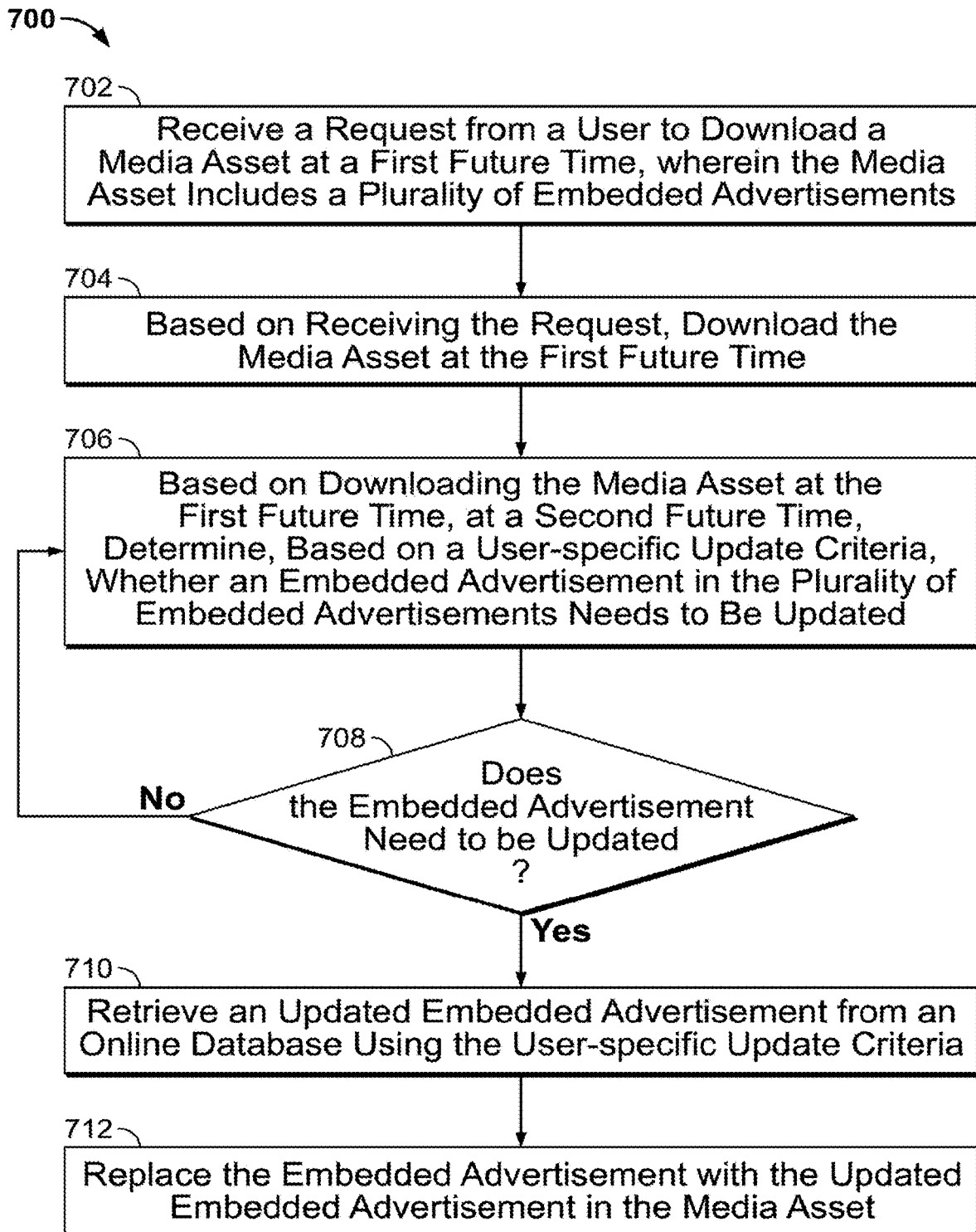
FIG. 7 depicts an illustrative flowchart of a process for determining whether to update an embedded advertisement in a media asset.

FIG. 7 depicts an illustrative flowchart of a process for determining whether to update an embedded advertisement in a media asset, in accordance with some embodiments of the disclosure. Process 700 begins at 702, where control circuitry 404 receives a request from a user to download a media asset at a first future time, where the media asset includes a plurality of embedded advertisements. Control circuitry 404 receives user input by way of user input interface 410. For example, control circuitry 404 may receive a user request, by way of user input interface 410, to download a media asset from media content source 516. At 704, based on receiving the request, control circuitry 404 downloads the media asset at the first future time. Control circuitry 404 downloads the media asset from media content source 516. For example, control circuitry 404 may download the media asset (e.g., the media asset may be an episode of a television series) from media content source 516. At 706, based on downloading the media asset at the first future time, at a second future time, control circuitry 404 determines, based on a user-specific update criteria, whether an embedded advertisement in the plurality of embedded advertisements needs to be updated. For example, control circuitry 404 may determine, from comparing metadata for the embedded advertisement retrieved from media guidance data source 518 to the user-specific update criteria, whether the embedded advertisement needs to be updated. Control circuitry 404 determines whether to update an embedded advertisement in the plurality of embedded advertisements in the same manner described above with respect to FIG. 1. For example, control circuitry 404 may determine to update an embedded advertisement in the plurality of embedded advertisement based on a time-of-day criteria. At 708, control circuitry 404 determines whether the embedded advertisement needs to be updated. Control circuitry 404 determines whether to update an embedded advertisement in the plurality of embedded advertisements in the same manner described above with respect to FIG. 1.

If, at 708, control circuitry 404 determines that "No," the embedded advertisement does not need to be updated, then process 708 reverts to 706. If, at 708, control circuitry 404 determines that "Yes," the embedded advertisement needs to be updated, then process 708 proceeds to 710. At 710, control circuitry 404 retrieves an updated embedded advertisement from an online database using the user-specific update criteria. Control circuitry 404 retrieves the updated embedded advertisement from media content source 516 using communications network 514. For example, control circuitry 404 may retrieve an updated embedded advertisement from media content source 516, and store the updated embedded advertisement on storage 408. At 712, control circuitry 404 replaces the embedded advertisement with the updated embedded advertisement in the media asset. For example, control circuitry 404 replaces the embedded advertisement with the updated embedded advertisement by setting an advertisement pointer in the metadata of the media asset to point to the location of the updated embedded advertisement in storage 408.

Figure 8:
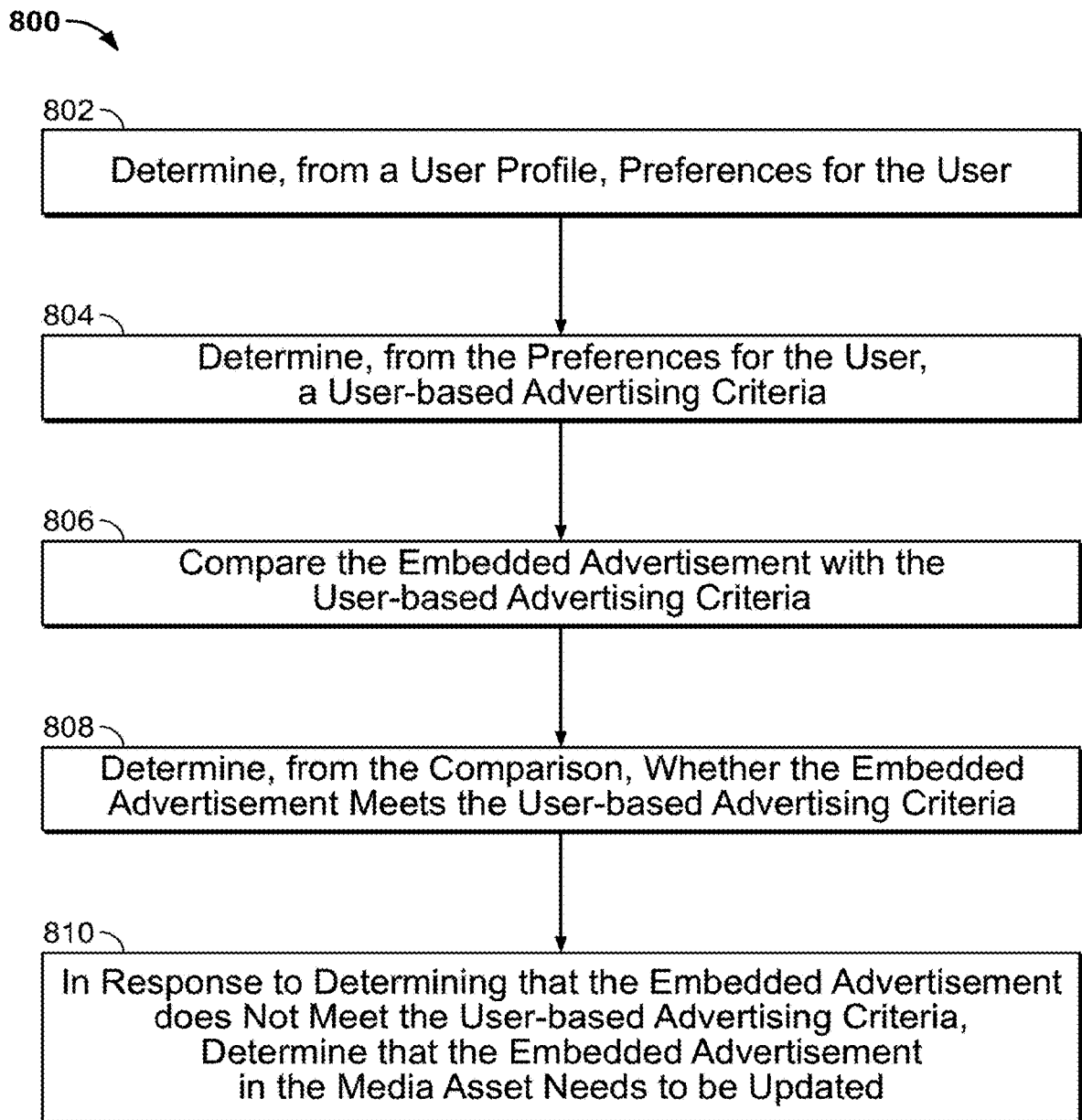
FIG. 8 depicts an illustrative flowchart of a process for determining whether an embedded advertisement in a media asset needs to be updated based on user-based advertising criteria.

FIG. 8 depicts an illustrative flowchart of a process for determining whether an embedded advertisement in a media asset needs to be updated based on user-based advertising criteria. Process 800 begins at 802, where control circuitry 404 determines, from a user profile, preferences for the user. For example, control circuitry 404 may retrieve a user profile from storage 408, or via communications network 514. Control circuitry 404 may determine, from the user profile, preferences for the user (e.g., user's sports preferences, user's movie preferences, user's shopping preferences, etc.). At 804, control circuitry 404 determines, from the preferences for the user, user-based advertising criteria. Control circuitry 404 determines the user-based advertising criteria in the same manner described above with respect to FIG. 1. For example, control circuitry 404 may determine the user-based advertising criteria by using processing circuitry 406 to determine the preferences ranked "high," and may create criterion from the highly ranked preferences. At 806, control circuitry 404 compares the embedded advertisement with the user-based advertising criteria. Control circuitry 404 uses processing circuitry 406 to compare the embedded advertisement with the user-based advertising criteria. For example, control circuitry 404 may compare the embedded advertisement (e.g., an advertisement for the action movie, The Mummy) with the user-based advertising criteria (e.g., maybe a criteria that requires the advertisement to be a movie trailer). At 808, control circuitry 404 determines, from the comparison, whether the embedded advertisement meets the user-based advertising criteria. For example, control circuitry 404 may determine from comparing the embedded advertisement (e.g., an advertisement for the action movie, The Mummy) with the user-based advertising criteria (e.g., may be a criteria that requires the advertisement to be shopping related) that the embedded advertisement does not meet the user-based advertising criteria. At 810, in response to determining that the embedded advertisement does not meet the user-based advertising criteria, control circuitry 404 determines that the embedded advertisement in the media asset needs to be updated. For example, control circuitry 404 may determine that the embedded advertisement (e.g., an advertisement for the action movie, The Mummy) does not meet the user-based advertising criteria (e.g., may be a criteria that requires the advertisement to be shopping related), and that the embedded advertisement in the media asset needs to be updated.

It should be noted that processes 600-800 or any step thereof could be performed on, or provided by, any of the devices shown in FIGS. 1 and 4-5. For example, any of processes 600-800 may be executed by control circuitry 404 (FIG. 4) as instructed by control circuitry implemented on user equipment 502, 504, 506 (FIG. 5), and/or a user equipment device for selecting a recommendation. In addition, one or more steps of processes 600-800 may be incorporated into or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of user equipment 100 stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   receiving a request from a user to download a media asset;
   identifying, based on an original user advertising criteria, a first advertisement to be embedded with the media asset, wherein the first advertisement satisfies the original user advertising criteria;
   downloading the media asset with the first advertisement embedded with the media asset;
   determining, after a period of time has elapsed from the download, that the original user advertising criteria has changed to an updated user advertising criteria;
   determining that the first advertisement embedded with the media asset fails to satisfy the updated user advertising criteria; and
   in response to determining (a) that the original user advertising criteria has changed to the updated user advertising criteria, and (b) that the first advertisement embedded with the media asset fails to satisfy the updated user advertising criteria:
      retrieving a second advertisement from a plurality of advertisements that satisfies the updated user advertising criteria; and
      replacing the first advertisement embedded with the media asset by embedding the second advertisement within the downloaded media asset.

2. The method of claim 1, wherein the original user advertising criteria and the updated user advertising criteria include user preferences based on social media preferences of the user.

3. The method of claim 1, wherein the original user advertising criteria and the updated user advertising criteria include a threshold popularity advertising criteria, and wherein the second advertisement is retrieved only if it exceeds the threshold popularity advertising criteria.

4. The method of claim 1, further comprising:
   retrieving, from the updated user advertising criteria, a threshold period of time;
   retrieving, from metadata for the first advertisement, an age of the first advertisement;
   comparing the age of the first advertisement with the threshold period of time;
   in response to determining that the age of the first advertisement exceeds the threshold period of time, determining that the first advertisement in the media asset needs to be updated; and
   based on determining the first advertisement needs to be updated, replacing the first advertisement with the second advertisement.

5. The method of claim 1, further comprising:
   periodically determining whether the original user advertising criteria have changed by:
      retrieving the updated user advertising criteria; and
      determining whether the updated user advertising criteria are different from the original user advertising criteria.

6. The method of claim 1, further comprising:
   receiving, from the user, an indication of a future time at which the user plans to view the media asset;
   comparing the second advertisement with a time-of-day advertising criteria;
   determining, from the comparing, whether the second advertisement meets the time-of-day advertising criteria; and
   in response to determining that the second advertisement meets the time-of-day advertising criteria, replacing the first advertisement with the second advertisement.

7. The method of claim 1, further comprising:
   storing the second advertisement in association with the downloaded media asset in a non-transitory computer-readable medium.

8. The method of claim 1, wherein the updated user advertising criteria comprise preferred media genres.

9. The method of claim 1, further comprising:
   determining that the user has previously viewed the first advertisement; and
   replacing the first advertisement embedded with the media asset with the second advertisement in response to determining that that user has previously viewed the first advertisement.

10. The method of claim 9, wherein determining that the user has previously viewed the first advertisement includes determining that the user has viewed a threshold percentage of the first advertisement.

11. A system, comprising:
   a non-transitory computer-readable medium; and
   control circuitry configured to:

receive a request from a user to download a media asset;

identify, based on an original user advertising criteria, a first advertisement to be embedded with the media asset, wherein the first advertisement satisfies the original user advertising criteria;

download the media asset with the first advertisement embedded with the media asset;

determine, after a period of time has elapsed from the download, that the original user advertising criteria has changed to an updated user advertising criteria;

determine that the first advertisement embedded with the media asset fails to satisfy the updated user advertising criteria; and in response to determining that (a) the original user advertising criteria has changed to the updated user advertising criteria, and (b) the first advertisement embedded with the media asset fails to satisfy the updated user advertising criteria:

retrieve a second advertisement from a plurality of advertisements that satisfies the updated user advertising criteria; and replace the first advertisement embedded with the media asset by embedding the second advertisement within the downloaded media asset.

12. The system of claim 11, wherein the original user advertising criteria and the updated user advertising criteria include user preferences based on social media preferences of the user.

13. The system of claim 11, wherein the original user advertising criteria and the updated user advertising criteria include a threshold popularity advertising criteria, and wherein the second advertisement is retrieved only if it exceeds the threshold popularity advertising criteria.

14. The system of claim 11, wherein the control circuitry is further configured to:

retrieve, from the updated user advertising criteria, a threshold period of time;

retrieve, from metadata for the first advertisement, an age of the first advertisement;

compare the age of the first advertisement with the threshold period of time;

in response to determining that the age of the first advertisement exceeds the threshold period of time, determine that the first advertisement in the media asset needs to be updated; and based on determining the first advertisement needs to be updated, replace the first advertisement with the second advertisement.

15. The system of claim 11, wherein the control circuitry is further configured to:

periodically determine whether the original user advertising criteria have changed by:

retrieving the updated user advertising criteria; and determining whether the updated user advertising criteria are different from the original user advertising criteria.

16. The system of claim 11, wherein the control circuitry is further configured to:

receive, from the user, an indication of a future time at which the user plans to view the media asset;

compare the second advertisement with a time-of-day advertising criteria;

determine, from the comparing, whether the second advertisement meets the time-of-day advertising criteria; and in response to determining that the second advertisement meets the time-of-day advertising criteria, replace the first advertisement with the second advertisement.

17. The system of claim 11, wherein the control circuitry is further configured to:

store the second advertisement in association with the downloaded media asset in a non-transitory computer-readable medium.

18. The system of claim 11, wherein the updated user advertising criteria comprise preferred media genres.

19. The system of claim 11, wherein the control circuitry is further configured to:

determine that the user has previously viewed the first advertisement; and replace the first advertisement embedded with the media asset with the second advertisement in response to determining that that user has previously viewed the first advertisement.

20. The system of claim 19, wherein determining that the user has previously viewed the first advertisement includes determining that the user has viewed a threshold percentage of the first advertisement.

* * * * *